UNITED STATES PATENT OFFICE.

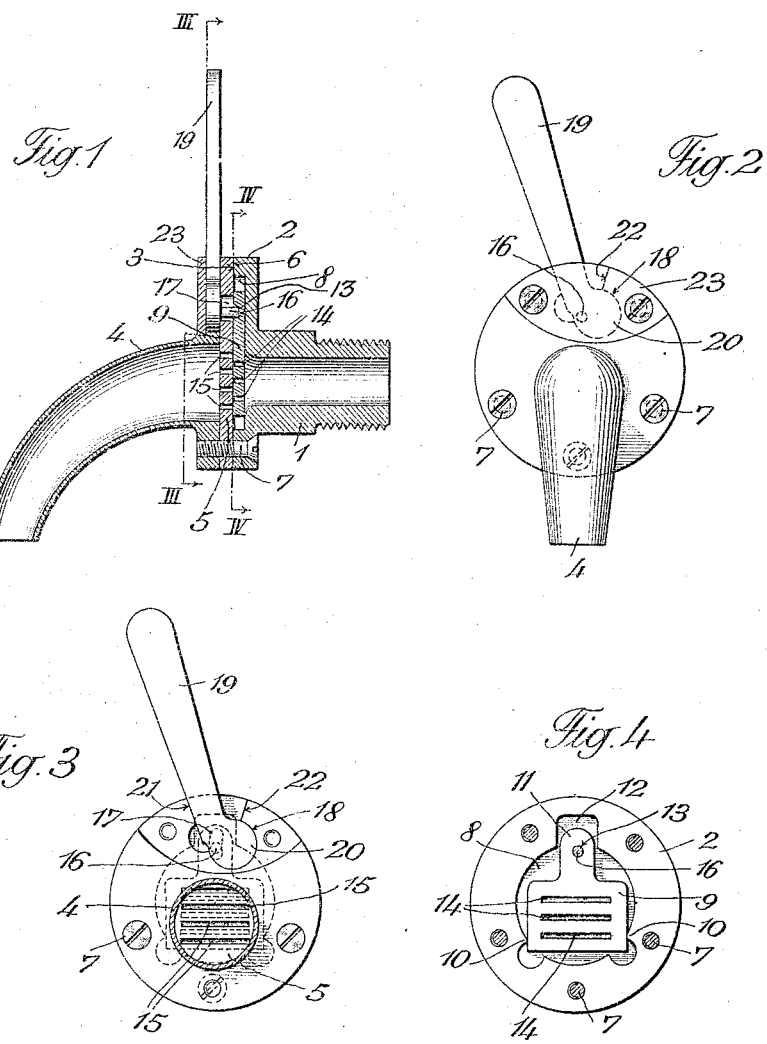

GOTTLIEB BODMER, OF ZURICH, SWITZERLAND.

COCK FOR LIQUIDS AND VAPORS.

1,296,746.     Specification of Letters Patent.     Patented Mar. 11, 1919.

Application filed October 21, 1918. Serial No. 258,962.

*To all whom it may concern:*

Be it known that I, GOTTLIEB BODMER, a citizen of the Republic of Switzerland, residing at Zurich, Centralstrasse 53, Switzerland, have invented certain new and useful Improvements in Cocks for Liquids and Vapors; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to improvements in cocks for liquid and vapors, comprising a movable grid valve having a tightening surface adapted to be pressed by the action of the fluid, the passage of which has to be controlled, against a tightening surface of a stationary member provided with slots.

The object of the present invention is to provide a cock of this kind in which the member for actuating the movable grid valve has its pivot-journal mounted in a flange of the casing of the cock consisting of several pieces adapted to be readily disconnected. Said movable member is connected thereby in such a manner with the grid valve and is mounted so in said flange that it may be removed at once; it is also provided with a circular end, which carries an eccentric pin and which rests in a circular bearing surface provided in said flange. The eccentric pin of the movable member passes through a hole of the plate coöperating with the movable grid valve, the engaging surfaces of said plate and valve forming a fluid-tight butt joint preventing the fluid from passing into said hole.

This invention will now be more particularly described with reference to the accompanying drawing illustrating by way of example an embodiment of the invention.

In this drawing:

Figure 1 is a vertical longitudinal section through the cock;

Fig. 2 is a front view of the cock.

Fig. 3 is a section on the line III—III of Fig. 1 and

Fig. 4 is a section on the line IV—IV of Fig. 1.

Referring to the drawing, 1 denotes one half of the casing of the cock provided with a passage-way for the fluid and adapted to be connected to a supply pipe not shown. 2 denotes a flange formed integral with said part 1 of the casing. The flange 2 forms a butt joint with an opposite surface 3 provided on a plate 5. 4 denotes the second half of the casing of the cock provided with a drain-passage for the fluid and with an end forming a flange. The surface 6 of the flange 2 and the adjoining opposite surface 3 of the plate 5 are smoothly polished, so that these surfaces form upon the fastening together of the parts 1, 5, 4 by means of screws 7, a liquid- and fluid-tight butt joint. Between a recessed portion of the flange 2 and the plate 5 is provided a chamber 8 communicating with the passage-way of the casing portion 1, and 9 denotes a grid valve adapted to be moved vertically within the chamber 8. The chamber has inward projections 10 acting as guides for the grid valve 9 and a recess 12 adapted to receive an extension 11 of the said grid valve 9, a small clearance being left between the walls of the recess 12 and the extension 11. The surface of the grid valve 9 coöperating with the surface 3 of the plate 5 is smoothly polished. The extension 11 has a recess 13, while the grid valve 9 has a plurality of through-going slots 14. A plate 5 is provided with through-going slots 15 having exactly the same shape as those of the grid valve 9.

A pin 16 extending through a hole 17 of the plate 5 and provided on a pivotally mounted hand lever 19 adapted to rotate in a circular bearing 18 engages into the recess 13 of the grid valve 9. The pivot-journal 20 of the lever 19 fits snugly into the circular bearing 18 provided in the flange-shaped end of the casing portion 4 and accessible from one side of the cock. 21 and 22 are stop-surfaces provided on the flange 4 for limiting the movement of lever 19. 23 is a covering plate securing the lever 19 in its proper position in the bearing 18.

The operation of the described cock is as follows:

The pressure exerted by the fluid flowing into the passage-way of the casing-portion 1 presses the grid valve 9 so tightly against the opposite surface 3 of the plate 5 that the fluid flowing out chamber 8 is prevented from passing into the hole 17 of plate 5. On the other hand, the screws 7 press the faces 6 and 3 of the flange 2 and the plate 5 respectively, so strongly against one another, that a fluid-tight butt joint is formed between said surfaces. Upon an actuation of the lever 19 pivotally mounted in the bearing 18, the pin 16 moves the grid valve 9 vertically within chamber 8, the slots 14 situated in the closed position of the cock opposite solid portions of the plate 5 being then moved so as to come to lie in a row with the slots 15 of plate 5, thus providing for a communication between the passage-ways of the two halves 1 and 4 of the casing.

In the cock hereinbefore described no packing material of any kind is required. Consequently, such a cock is particularly adapted, from the sanitary point of view, to be used for retailing liquors.

What I claim now as my invention is:

1. A cock for liquids and vapors, comprising a casing provided with a flange and a passage-way for the fluid, said flange being formed by a plurality of single pieces, a plate provided with through-going slots, means for connecting said pieces forming the flange and the plate rigidly together, said plate inclosing together with a piece of the flange a chamber, a grid valve pressed by the pressure of the fluid entering into the passage-way of the casing against said plate, and a member supported in a bearing provided in said flange of the casing and adapted to move the grid valve within said chamber, the coöperating surfaces of the grid valve and plate forming a fluid-tight joint preventing the passage of any fluid to the point where said movable member engages the grid valve.

2. A cock for liquids and vapors, comprising a casing provided with a flange and a passage-way for the fluid, said flange being formed by a plurality of single pieces, a plate provided with through-going slots, means for connecting said pieces forming the flange and the plate rigidly together, said plate inclosing together with a piece of the flange a chamber, a grid valve pressed by the pressure of the fluid entering into the passage way of the casing against said plate, a movable hand lever having a circular end resting in a circular bearing provided in said flange on the side of the plate lying opposite its side coöperating with the grid valve, and a pin arranged eccentrically on said circular end of the hand lever and passing through a slot of the plate and engaging into a recess of the grid valve, the latter being moved within said chamber upon an actuation of the hand lever, the coöperating surfaces of the grid valve and plate forming a fluid-tight butt joint preventing a passage of the fluid to said hole of the plate.

3. A cock for liquids and vapors, comprising a casing provided with a flange and a passage-way for the fluid, said flange being formed by a plurality of single pieces, a plate provided with through-going slots, means for connecting said pieces forming the flange and the plate rigidly together, said plate inclosing together with a piece of the flange a chamber, a grid valve pressed by the pressure of the fluid entering into the passageway of the casing against said plate, a movable hand lever having a circular end resting in a circular bearing provided in said flange on the side of the plate lying opposite its side coöperating with the grid valve and accessible from the side, stop-surfaces on the flange for limiting the movement of said lever, a pin arranged eccentrically on said circular end of the hand lever and passing through a slot of the plate and engaging into a recess of the grid valve, the latter being moved within said chamber upon an actuation of the hand lever, the coöperating surfaces of the grid valve and plate forming a fluid-tight butt joint preventing a passage of the fluid to said hole of the plate, and a removable plate for securing the hand lever in its proper position in said circular bearing surface.

In testimony that I claim the foregoing as my invention, I have signed my name.

GOTTLIEB BODMER.

Copies of this patent may be obtained for five cents each, by addressing the "Commissioner of Patents, Washington, D. C."